United States Patent
Harrah et al.

(10) Patent No.: US 12,456,191 B2
(45) Date of Patent: Oct. 28, 2025

(54) NON-CONTACT, NON-INVASIVE, AND QUANTITATIVE AGRICULTURAL MONITORING DEVICES AND SYSTEMS

(71) Applicant: UNIVERSITY OF SOUTH FLORIDA, Tampa, FL (US)

(72) Inventors: Mitchell Robert Harrah, Tampa, FL (US); Abdul Mohaimen Safi, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 472 days.

(21) Appl. No.: 17/960,758

(22) Filed: Oct. 5, 2022

(65) Prior Publication Data

US 2023/0103532 A1 Apr. 6, 2023

Related U.S. Application Data

(60) Provisional application No. 63/262,101, filed on Oct. 5, 2021.

(51) Int. Cl.
*G06K 9/00* (2022.01)
*G06T 7/00* (2017.01)
(Continued)

(52) U.S. Cl.
CPC .......... *G06T 7/0012* (2013.01); *G06V 10/145* (2022.01); *G06V 10/44* (2022.01); *G06V 10/7747* (2022.01); *G06V 20/68* (2022.01); *G06T 2207/30004* (2013.01); *G06T 2207/30188* (2013.01)

(58) Field of Classification Search
None
See application file for complete search history.

(56) References Cited

U.S. PATENT DOCUMENTS

| 2019/0200536 A1 | 7/2019 | Redpath |
| 2020/0150217 A1 | 5/2020 | Choi et al. |
| 2022/0268627 A1* | 8/2022 | Hermes ................ G01J 3/0256 |

OTHER PUBLICATIONS

Wu: "Detection of apple defect using laser-induced light backscattering imaging and convolutional neural network." Computers and Electrical Engineering, vol. 81, Jan. 2020, pp. 1-9) (Year: 2020).*

(Continued)

*Primary Examiner* — Wei Wen Yang
(74) *Attorney, Agent, or Firm* — HUSCH BLACKWELL LLP

(57) ABSTRACT

Methods and systems for agricultural monitoring are disclosed. The methods and systems include: projecting, by a light source, a coherent light output on at least a part of a plant material; acquiring, by an imaging device, one or more speckle images based on the coherent light output backscattered by at least the part of the plant material; providing the one or more speckle images to a trained machine learning algorithm; identifying one or more healthy status indications of at least the part of the plant material based on one or more outputs from the trained machine learning algorithm, the one or more outputs corresponding to the one or more speckle images; and providing plant health information based on the healthy status indication. Other aspects, embodiments, and features are also claimed and described.

24 Claims, 4 Drawing Sheets

(51) Int. Cl.
  G06V 10/145 (2022.01)
  G06V 10/44 (2022.01)
  G06V 10/774 (2022.01)
  G06V 20/68 (2022.01)

(56) References Cited

OTHER PUBLICATIONS

Ansari et al., "Assessment of biological leaf tissue using biospeckle laser imaging technique." Laser Physics 28.6 (2018): 065608. 1-9.
Boas et al., "Laser speckle contrast imaging in biomedical optics." Journal of biomedical optics 15.1 (2010): 011109-011109. 1-12.
Graham et al., "Agricultural impacts of sustainable water use in the United States." Scientific reports 11.1 (2021): 17917. 1-9.
Pandiselvam et al., "Biospeckle laser technique—A novel non-destructive approach for food quality and safety detection." Trends in Food Science & Technology 97 (2020): 1-13.
Qureshi et al., "Quantitative blood flow estimation in vivo by optical speckle image velocimetry." Optica 8.8 (2021): 1092-1101.
Safi et al., "Quantitative cerebral blood flow imaging with synthetic single-shot multi-exposure laser speckle imaging." Optics and the Brain. Optica Publishing Group, 2021. 1-2.
Senaratha et al., "Laser speckle contrast imaging: theory, instrumentation and applications." IEEE reviews in biomedical engineering 6 (2013): 99-110.
Singh et al., "Application of laser biospeckle analysis for assessment of seed priming treatments." Computers and electronics in agriculture 169 (2020): 105212. 1-13.
Skic et al., "Determination of the optimum harvest window for apples using the non-destructive biospeckle method." Sensors 16.5 (2016): 661. 1-15.
USDA-NASS. (2019). United States Department of Agriculture, National Agricultural Statistics Service. 2017 Census of Agriculture. In 2017 Census of Agriculture, pp. 1-820.
Veeck et al., "Challenges of agriculture and food systems issues in China and the United States." Geography and Sustainability 1.2 (2020): 109-117.
Zdunek et al., "Relation of biospeckle activity with chlorophyll content in apples." Postharvest Biology and Technology 64.1 (2012): 58-63.
Ryckewaert et al., "A new optical sensor based on laser speckle and chemometrics for precision agriculture: application to sunflower plant-breeding." Sensors 20.16 (2020): 4652. 1-14.
Matsuo et al., "Application of Laser Speckle method to Water Flow measurement in plant body." 2006 SICE-ICASE International Joint Conference. IEEE, 2006. 1-4.

* cited by examiner

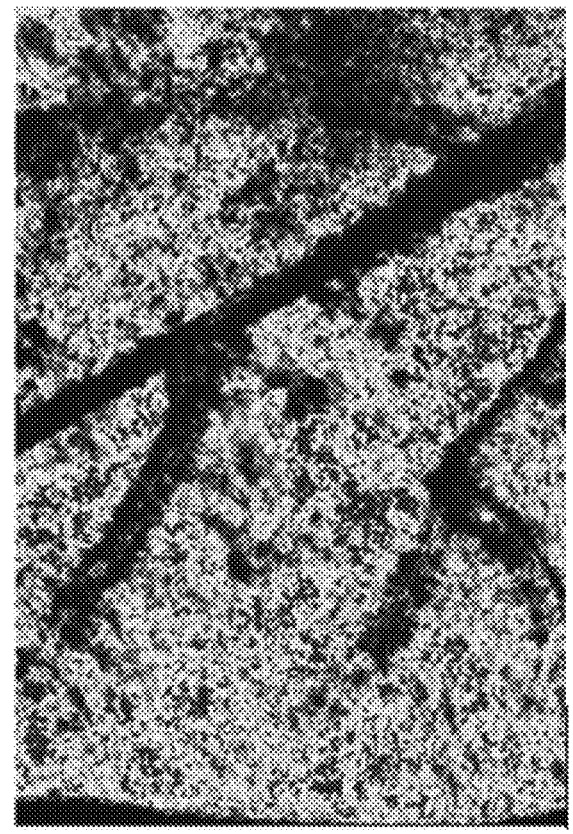
FIG. 4A
FIG. 4B
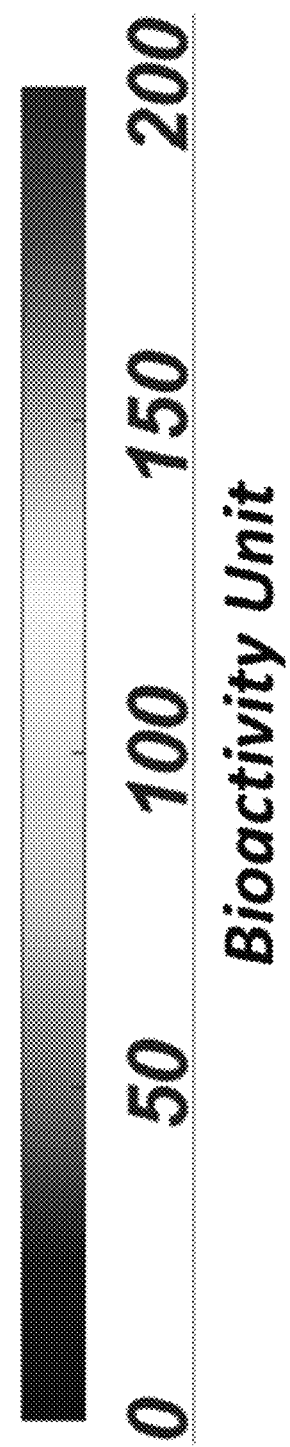

NON-CONTACT, NON-INVASIVE, AND QUANTITATIVE AGRICULTURAL MONITORING DEVICES AND SYSTEMS

CROSS-REFERENCE TO RELATED APPLICATION(S)

This application claims the benefit of U.S. Provisional Patent Application Ser. No. 63/262,101, filed Oct. 5, 2021, the disclosure of which is hereby incorporated by reference in its entirety, including all figures, tables, and drawings.

BACKGROUND

Agriculture relies heavily on large yields and precise timing. At the center of this industry, the main product is the food crop. The overall health of crops depends on functionality, growth, physiology, infections, and hydration, among a vast number of other factors. All the factors are dependent on the uptake and dispersion of water within the vessels of the plants. However, with a lack of in-depth consumer or industrial options for agriculture, farmers rely on standard harvest windows from previous years, which already vary based on climate and previous soil conditions. Further, plants are susceptible to diseases, which can spread across the fields. However, farmers do not have enough resources to monitor the fields and miss the window to suppress the diseases. What are needed is systems and methods that address one or more of these shortcomings.

SUMMARY

The following presents a simplified summary of one or more aspects of the present disclosure, to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects of the present disclosure, methods, systems, and apparatus for agricultural monitoring are disclosed. These methods, systems, and apparatus for agricultural monitoring may include steps or components for: projecting, by a light source, a coherent light output on at least a part of a plant material; acquiring, by an imaging device, one or more speckle images based on the coherent light output backscattered by at least the part of the plant material; providing the one or more speckle images to a trained machine learning algorithm; identifying one or more healthy status indications of at least the part of the plant material based on one or more outputs from the trained machine learning algorithm, the one or more outputs corresponding to the one or more speckle images; and providing plant health information based on the healthy status indication.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

BRIEF DESCRIPTION OF THE DRAWINGS

FIGS. 4A and 4B are example speckle images showing bioactivity levels of plants according to some embodiments.

DETAILED DESCRIPTION

The detailed description set forth below in connection with the appended drawings is intended as a description of various configurations and is not intended to represent the only configurations in which the subject matter described herein may be practiced. The detailed description includes specific details to provide a thorough understanding of various embodiments of the present disclosure. However, it will be apparent to those skilled in the art that the various features, concepts and embodiments described herein may be implemented and practiced without these specific details. In some instances, well-known structures and components are shown in block diagram form to avoid obscuring such concepts.

Figure 1:
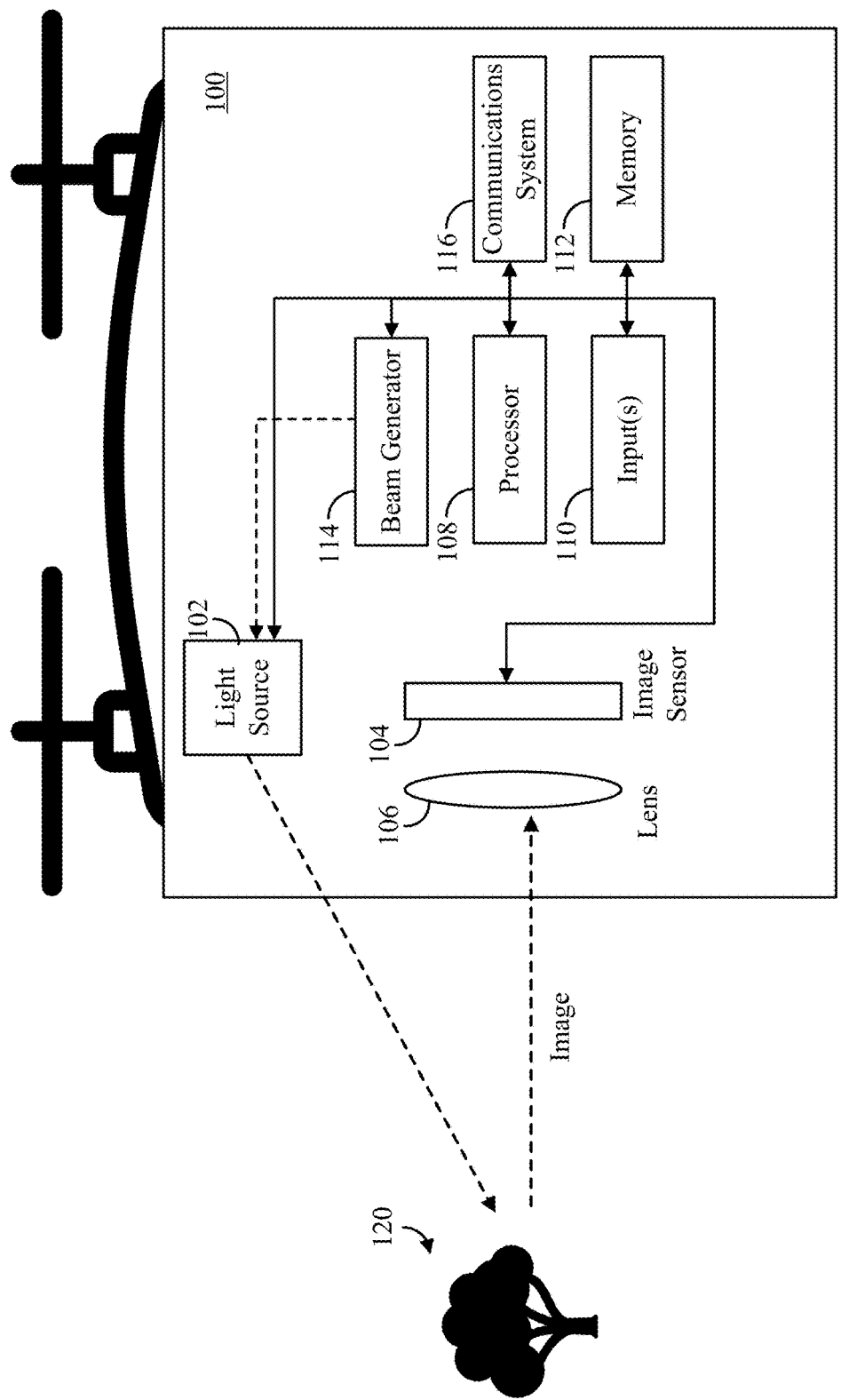
FIG. 1 is a block diagram conceptually illustrating a system for agricultural monitoring according to some embodiments.

FIG. 1 is a block diagram conceptually illustrating a system for agricultural monitoring according to some embodiments. As shown in FIG. 1, system 100 can include a light source 102; an image sensor 104; optics 106 (which can include, for example, a lens, a filter, etc.); a processor 108 for controlling operations of system 100 which can include any suitable hardware processor (e.g., a microprocessor, digital signal processor, a microcontroller, an image processor, a GPU, a mobile device/phone processor, etc., one or more of which can be implemented using a field programmable gate array (FPGA) or an application specific integrated circuit (ASIC)) or combination of hardware processors; an input device 110 (such as a shutter button, a menu button, a microphone, a touchscreen, a etc.) for accepting input from a user and/or from the environment; memory 112; a beam generator 114 for generating one or more coherent light outputs for driving light source 102; and a communication system 116 for allowing communication between processor 108 and other devices (e.g., light source 102, imaging device 104, 106, a smartphone, a wearable computer, a tablet computer, a laptop computer, a personal computer, a server, or any other suitable system, via a communication link.

In some embodiments, memory 112 can store pixel values output by image sensor 504, plane parameter loci calculated based on output from image sensor 504, etc. Memory 512 can include a storage device (e.g., a hard disk, a solid state drive, a Blu-ray disc, a Digital Video Disk (DVD), RAM, ROM, EEPROM, etc.) for storing a computer program for controlling processor 108. In some embodiments, memory 112 can include instructions for causing processor 108 to execute processes associated with the mechanisms described herein, such as processes described below in connection with FIG. 2. In some embodiments, memory 112 can include a trained machine learning algorithm to provide a healthy status information of the plant material 120 in real-time. In some embodiments, processor 108 coupled with memory 112 can process speckle images to provide the processed speckle images including structural and functional information to the trained machine learning algorithm.

In some embodiments, light source 102 can be any suitable light source that can be configured to emit a coherent light output toward one or more plant materials or agricultural products 120. In some embodiments, a plant material or an agricultural product 120 can include a plant, a leaf, a stalk, a seed, a fruit, or any other suitable portion of a plant or similar organism. In further embodiments, light source 102 can be implemented using a laser. The laser can include a low coherence laser diode module (e.g., with a coherence length of 1 m or shorter). However, it should be appreciated that the laser can also include a high coherence laser diode module (e.g., with a coherence length of 100 m or longer). In further embodiments, light source 102 is not limited to a laser. It can be any other suitable light source to be used to generate a speckle image. In some embodiments, light source 102 can be a single wavelength laser or a multi-wavelength laser (e.g., red 633 nm, green 532 nm, and blue 473 nm).

In some embodiments, image sensor 104 can be any suitable image sensor that can receive light reflected by plant material 120, such as a charged coupled device (CCD) sensor, a complementary metal oxide semiconductor (CMOS) sensor, a single-photon avalanche diode (SPAD) sensor, etc. It should be appreciated that image sensor 104 can be any other suitable sensor to capture light reflected by plant material 120.

In some embodiments, optics 106 can include optics for focusing light received from plant material 120 and any other suitable optics. In some embodiments, optics 106 can be adjustable based on light source 102. For example, based on low coherence of light source 102, optics 106 can have a focal length between 100 mm to 200 mm to have suitable resolution of the plant material 120. In some embodiments, beam generator 114 can be one or more beam generators that can generate coherent light outputs.

In some embodiments, system 100 can communicate with a remote device over a network using communication system 116 and a communication link. Additionally or alternatively, system 100 can be included as part of another device, such as a drone, a tractor, a tiller, a small rover, a boom sprayer, a smartphone, a tablet computer, a laptop computer, etc. Parts of system 100 can be shared with a device within which system 100 is integrated. For example, if system 100 is integrated with a smart mobile device, processor 108 can be a processor of the smart mobile device and can be used to control operation of system 100. In some embodiments, system 100 can be a single device. For example, system 100 can be included in a device (e.g., drone, tractor, tiller, small rover, boom spray, hand-held device, camera, etc.), which includes light source 102, imaging device 104, 106, processor 108 (with input(s) 110 memory 112, beam generator 114, and/or communications system 116) to perform task (e.g., process 200 described in connection with FIG. 2). In other embodiments, system 100 can include physically separate components. For example, imaging device 104, 106 and processor 108 (with input(s) 110 and/or memory) can be in a device (e.g., drone, tractor, tiller, small rover, boom spray, hand-held device, camera, etc.) while light source 102 is a separate device, which can be attached or detached to the drone. In other embodiments, processor 108 (with input(s) 110 and/or memory) can be in a smart mobile device and uses imaging device 104, 106 (e.g., in a drone, or a separate camera). Further, light source 102 can be attached and detached to imaging device 104 106 or the smart mobile device. Then, processor 108 can communicate with light source 102 and/or imaging device 104, 106 using communication system 116 and a communication link.

In some embodiments, system 100 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as an automated system, a semi-automated system, a digital camera, a security camera, an outdoor monitoring system, a smartphone, a wearable computer, a tablet computer, a personal data assistant (PDA), a personal computer, a laptop computer, a multimedia terminal, a game console or peripheral for a gaming counsel or any of the above devices, a special purpose device, etc.

Communications by communication system 116 via a communication link can be carried out using any suitable computer network, or any suitable combination of networks, including the Internet, an intranet, a wide-area network (WAN), a local-area network (LAN), a wireless network, a wired network, a digital subscriber line (DSL) network, a frame relay network, an asynchronous transfer mode (ATM) network, and a virtual private network (VPN). The communications link can include any communication links suitable for communicating data between system 100 and another device, such as a network link, a wired link, a dial-up link, a wireless link, a hard-wired link, any other suitable communication link, or any suitable combination of such links. System 100 and/or another device (e.g., a server, a personal computer, a smartphone, etc.) can enable a user to execute a computer program that uses information derived using the mechanisms described herein to, for example, identify one or more surfaces in a scene that can be approximated as a portion of a plane. In some embodiments, processor 108 can send and receive data through the communication link or any other communication link(s) using, for example, a transmitter, receiver, transmitter/receiver, transceiver, or any other suitable communication device.

Figure 2:
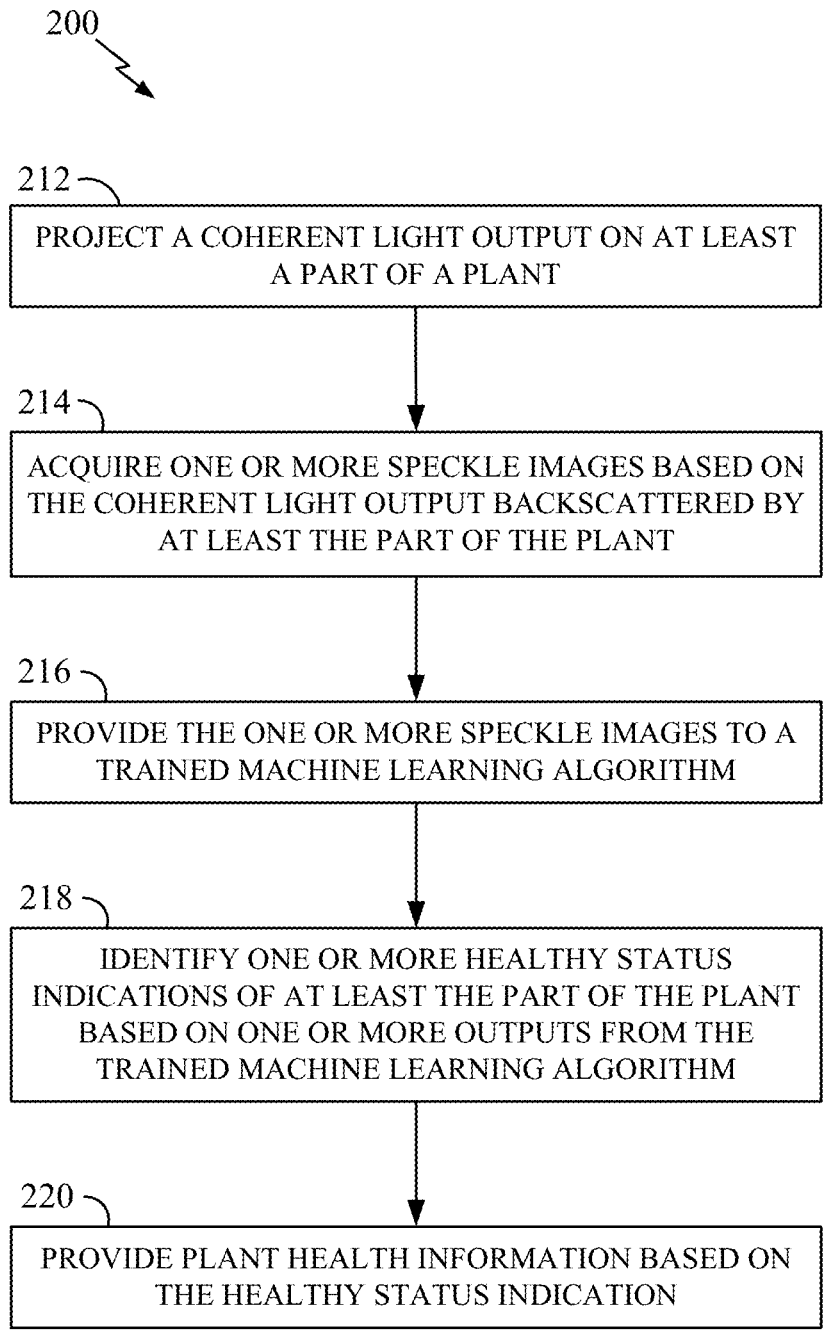
FIG. 2 is a flow diagram illustrating an example process for agricultural monitoring according to some embodiments.

FIG. 2 is a flow diagram illustrating an example process 200 for agricultural monitoring in accordance with some aspects of the present disclosure. As described below, a particular implementation can omit some or all illustrated features/steps, may be implemented in some embodiments in a different order, and may not require some illustrated features to implement all embodiments. In some examples, an apparatus (e.g., processor 108 with memory 112) in connection with FIG. 1 can be used to perform example process 200. However, it should be appreciated that any suitable apparatus or means for carrying out the operations or features described below may perform process 200.

At step 212, process 200 can project, by a light source, a coherent light output on at least a part of a plant material, such as a leaf or stalk of an agricultural crop (as one example). In some examples, a light source can be a laser (e.g., an inexpensive low coherence laser diode module). For example, an off-the-shelf inexpensive low-coherence laser module (e.g., a laser diode with wavelengths (λ) of 630 nm and output power of 4.5 mW) rather than a high coherence laser module can be used to project a coherent light output. In some examples, the high coherence laser module can have single frequency lasers (e.g., having a coherence length of more than 100 m). In further examples, the low coherence laser module can have single frequency lasers (e.g., having a coherence length of equal to or less than 1 m). In further examples, the coherent light output can be an electromagnetic field with the same frequency and phase of waves, which is illuminated from a laser module. In even further examples, to project a coherent light output on a plant material, process 200 can position mobile hardware (e.g., a drone, a vehicle, a mobile device, a hand-held device, a tractor, a tiller, a small rover, a boom sprayer, etc.) over the plant material. In further examples, the coherent light output can include lower than a predetermined level of coherence or a predetermined level of output power. For example, the coherent light output can include an output power level equal to or lower than 40 mW. In further examples, a plant material can include a plant, a seed, a fruit, or any other suitable living organism. In even further examples, at least the part of the plant material can include a lesion of a plant, a leaf/twig/branch/limb/trunk of a plant, a seed, a fruit, or any other suitable part of the plant material.

At step 214, process 200 can acquire, by an imaging device, one or more speckle images based on the coherent light output backscattered by at least the part of the plant material. For example, the imaging device can record or image a backscattered light beam from at least part of the plant material. In some examples, the imaging device can include a lens (e.g., an objective lens) and a sensor (e.g., a charged coupled device (CCD) sensor, a complementary metal oxide semiconductor (CMOS) sensor, a single-photon avalanche diode (SPAD) sensor, etc.) to acquire the one or more speckle images. In some examples, the imaging device can use a predetermined focal length (e.g., 100 mm-200 mm) from the lens to the sensor in the imaging device for suitable resolution of the lesion. However, it should be appreciated that any other suitable focal length or a dynamic focal length of the imaging device can be exploited. In further examples, the imaging device can continuously record the one or more speckle images or record the one or more speckle images on periodic basis. In even further examples, a user can control the imaging device to record the one or more speckle images.

In some examples, the imaging device can provide raw images, and process 200 can preprocess the raw images to produce one or more speckle images. In some examples, process 200 can remove some raw images with low quality or artifacts. For example, process 200 can detect blurred edges of a leaf or an object in an image and remove the image. Process 200 can also detect an image including an object or a color (e.g., black, white, etc.) occupying more than a predetermined part (50%, 75%, 90%, or any suitable portion of an image) of the image and removing the image. Thus, process 200 can select suitable images among the raw images for the one or more speckle images. However, it should be appreciated that any other suitable preprocessing can be used to produce the one or more speckle images.

In further examples, the one or more speckle images can be generated by spatially averaging one or more corresponding raw images with moving windows. For example, process 200 can continuously record raw images (e.g., at a frame rate of 100 fps at an exposure time of 250 μs). For example, spatially averaging a 250 μs raw image with a 2×2 moving spatial window can yield a 1 ms exposure speckle image. Process 200 can compute speckle contrast images by estimating the temporal speckle contrast (n=100 frames) at each pixel. This process can be repeated for exposure 250 μs to 25 ms. Additional details with regard to speckle imagining are described in a co-pending International Application No. PCT/US22/22734, which is incorporated by reference herein in its entirety.

Figure 3:
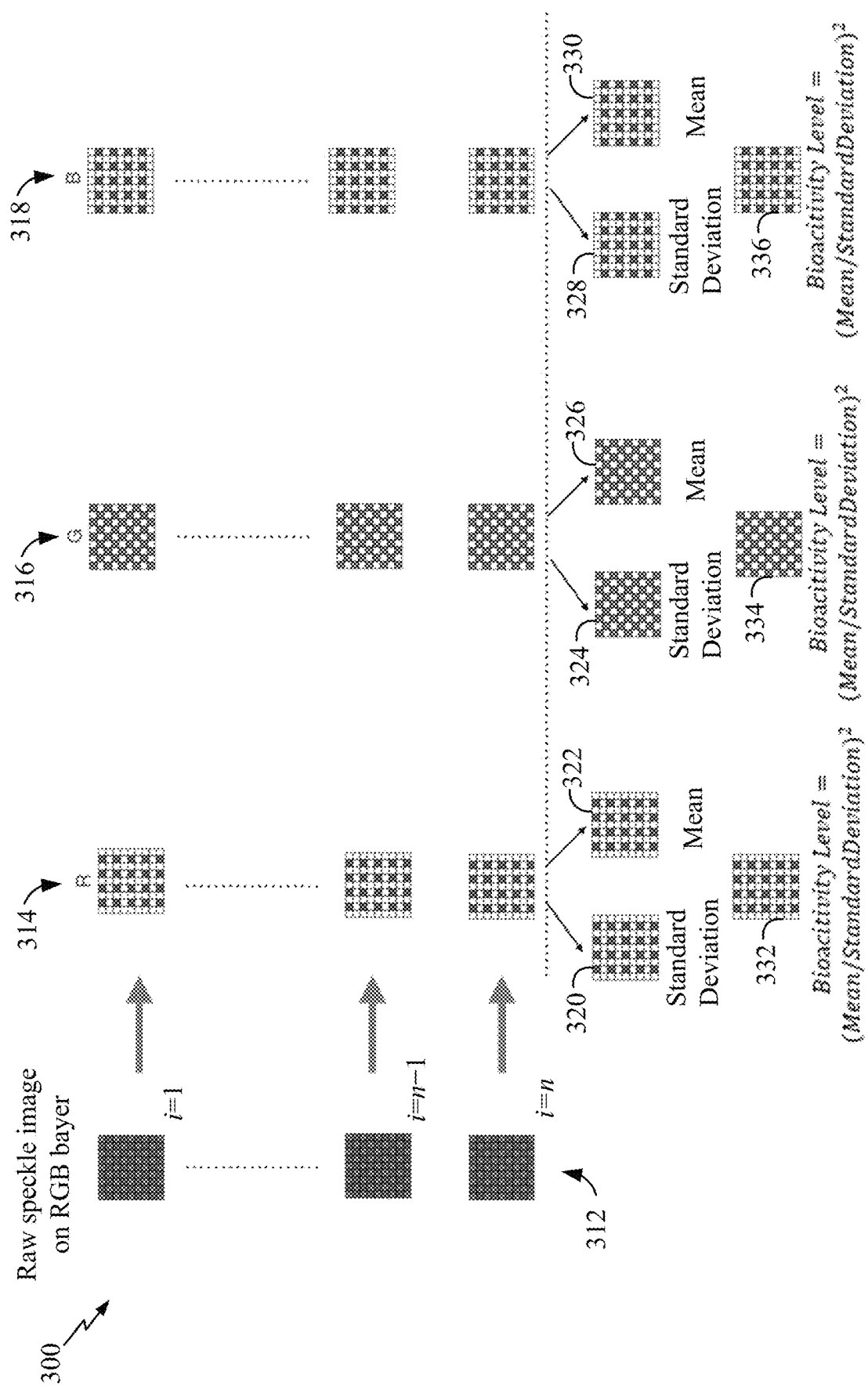
FIG. 3 illustrates an example temporal speckle contrast algorithm according to some embodiments.

In other examples, the one or more speckle images can be generated by using temporal averaging and standard deviation of multiple raw speckle images. For example, the one or more speckle images can be one or more processed speckle images with a temporal speckle contrast algorithm for each pixel of the one or more raw images (e.g., raw speckle images). For examples, the temporal speckle contrast algorithm can use a standard deviation and a mean bioactivity level for each pixel, which can be expressed as, BioactivityLevel=(Mean/StandardDeviation)$^2$. FIG. 3 shows an example temporal speckle contrast algorithm 300. In some examples, process 300 can receive multiple raw speckle images (n raw images) 312. Process 300 can generate three color images (e.g., R color image 314, G color image 316, and B color image 318) for each raw image 312 (e.g., using a bayer filter). Then, the standard deviation 320 and the mean value 322 can be calculated for multiple R color images (n R color images 314). The bioactivity level 332 for the R color images can be calculated using the equation above. Similarly, the standard deviation 324 and the mean value 326 can be calculated for multiple G color images (n G color images 316). The bioactivity level 334 for the G color images can be calculated using the equation above. The standard deviation 328 and the mean value 330 can be calculated for multiple B color images (n B color images 318). The bioactivity level 336 for the B color images can be calculated using the equation above.

The temporal speckle contrast algorithm can provide structural imaging with functional imaging. In addition, the temporal speckle contrast algorithm can be performed with low computational cost and can allow on board real-time processing (e.g., with simple smart-phone, microcontroller field-programmable gate array (FPGA), etc.). In further examples, process 200 can utilize the bayer pattern of the imaging device. The one or more speckle images (i.e., one or more processed speckle images with the temporal speckle contrast algorithm) can include structural and functional images of agricultural products bioactivity. Temporal speckle imaging allows obtaining structural and functional imaging from the same recorded raw images. Combination of structural and functional imaging allows establishment of ground truth for the underlying cause. For example, exposing the plant to sunlight will show the growth of the plant but when both structural and functional imaging are used, a relationship amount of sunlight, plant growth, and different nutrients levels can be established in a longitudinal fashion. Thus, process 200 can provide high resolution structural imaging of at least the part of the plant material (e.g., lesion) and functional imaging of at least the part of the plant material simultaneously.

In embodiments using a color camera, a bayer pattern can be utilized, whereas other embodiments may utilize a single wavelength (633 nm) laser and only red channel data may be used. However, if a multi wavelength laser (e.g., red 633 nm, green 532 nm, blue 473 nm) is utilized, then a camera having an IR pattern along with an R,G,B pattern can be used to allow an IR laser (e.g., of 780 to 850 nm), to be used simultaneously. Hence, with a single snapshot such embodiments can obtain multiple types of data in real time. And advantage of multiwavelength is it allows obtaining much higher quantities of data in a single scan than typical single wavelength based approaches. In the biological imaging field, application of multiwavelength lasers allows properties such as a) blood/water flow, b) oxygen hemoglobin information, c) doxy hemoglobin information d) oxygen saturation ratio, e) nutrient uptake/flow, f) water content, g) pigment/chlorophyl content, and h) other optical properties. Having multiple forms of data accessible from a scan of a plant material can further aid in diagnosing specific physiological conditions, such as low water uptake, mold, and other disease states.

In further examples, process 200 can acquire, by the imaging device, one or more visual images corresponding to the one or more speckle images. In some examples, process 200 can acquire the one or more visual images when the light source does not generate the coherent light output. Thus, when process 200 projects the coherent light output, process 200 can acquire the one or more speckle images. On the other hand, when process 200 does not project the coherent light output, process 200 can acquire the one or more visual images. In some examples, process 200 can acquire a visual image corresponding to a speckle image for at least a part of plant material. Thus, the part of plant material can have a pair of images (e.g., a speckle image and a visual image). It should be appreciated that the one or more visual images do not need to correspond to the one or more speckle images. For example, process 200 can acquire one visual image and multiple speckle images for the part of plant material or acquire multiple visual images and one speckle image for the part of plant material. In other examples, process 200 can acquire one or more visual images for a first part of plant material and one or more speckle images for a second part of plant material.

In further examples, the imaging device and the light source along with processor 108 and memory 112 to generate the coherent light output from the light source 102 and acquire the one or more speckle images from the imaging device can be included in a single receptacle. The single receptacle can be attached and detached to the mobile hardware (e.g., a drone, a vehicle, a mobile device, a hand-held device, etc.). In other examples, the light source and the imaging device can be in separate receptacles. For example, the imaging device can be equipped with a drone (e.g., a drone camera). The light source can be attached and detached to the drone. In some non-limiting scenarios, processor 108 and memory 112 can be in the same receptacle as the light source and receive raw images from the imaging device in the drone. In some non-limiting scenarios, processor 108 and memory 112 can be in the drone or imaging device on the drone and receive raw images from the imaging device. However, it should be appreciated that processor 108 and memory 112 can be in a cloud server and receive one or more speckle images or raw images via a communication network.

At step 216, process 200 can provide the one or more speckle images to a trained machine learning algorithm. In some example, the one or more speckle images can be one or more processed speckle images (e.g., with temporal speckle pricing algorithm. The one or more processed speckle images can include structural and/or function information of the images. In some examples, the trained machine learning algorithm can provide an output. In some examples, the output can be a healthy plant material indication or an unhealthy plant material indication. For example, the trained machine learning algorithm can provide an output indicating whether the part of the plant material is in a healthy state or an unhealthy state based on the input (e.g., one or more speckle images for the part of the plant material). In other examples, the output can indicate a healthy state or a type (e.g., a type of disease, a dehydrated state, a type of pest causing the unhealthy state, etc.) of unhealthy state.

In some examples, the trained machine learning algorithm can include an input layer, one or more hidden layers (or nodes), and an output layer. Typically, the input layer includes as many nodes as inputs provided to the machine learning algorithm. The number (and the type) of inputs provided to the machine learning algorithm may vary based on the classification task for the machine learning algorithm. In some examples, the inputs can include the one or more speckle images. In further examples, the inputs can further include the one or more visual images.

The input layer connects to one or more hidden layers. The number of hidden layers varies and may depend on the particular task for the machine learning algorithm. Additionally, each hidden layer may have a different number of nodes and may be connected to the next layer differently. For example, each node of the input layer may be connected to each node of the first hidden layer. The connection between each node of the input layer and each node of the first hidden layer may be assigned a weight parameter. Additionally, each node of the neural network may also be assigned a bias value. In some configurations, each node of the first hidden layer may not be connected to each node of the second hidden layer. That is, there may be some nodes of the first hidden layer that are not connected to all of the nodes of the second hidden layer. The connections between the nodes of the first hidden layers and the second hidden layers are each assigned different weight parameters. Each node of the hidden layer is generally associated with an activation function. The activation function defines how the hidden layer is to process the input received from the input layer or from a previous input or hidden layer. These activation functions may vary and be based on the type of task associated with the machine learning algorithm and also on the specific type of hidden layer implemented.

Each hidden layer may perform a different function. For example, some hidden layers can be convolutional hidden layers which can, in some instances, reduce the dimensionality of the inputs. Other hidden layers can perform statistical functions such as max pooling, which may reduce a group of inputs to the maximum value; an averaging layer; batch normalization; and other such functions. In some of the hidden layers each node is connected to each node of the next hidden layer, which may be referred to then as dense layers. Some neural networks including more than, for example, three hidden layers may be considered deep neural networks.

The last hidden layer in the machine learning algorithm is connected to the output layer. In an example in which the machine learning algorithm, the output layer may include, for example, a number of different nodes, where each different node corresponds to a different state. In some examples, a first node can indicate healthy plant material indication, and a second node can indicate an unhealthy plant material indication. In other examples, a first node can indicate a healthy state, other nodes can indicate types (e.g., a type of disease, a dehydrated state, a type of pest causing the unhealthy state, etc.) of unhealthy state. In some examples, each node can return a confidence score between 0 and 1 indicating the probability of the predicted class. In further examples, the trained machine learning algorithm can provide an output of the node having the highest confidence score among the multiple nodes. For example, the trained machine learning algorithm receives a speckle image and provides 0.8 confidence score for the healthy plant material indication and 0.2 confidence score for the unhealthy plant material indication. Then, the trained machine learning algorithm can provide the output of the healthy plant material indication. In other examples, the machine learning algorithm can provide the confidence scores of each node or class, and process 200 can determine a healthy status indication based on the confidence scores.

During training, the machine learning algorithm receives the inputs for a training example and generates an output using the bias for each node, and the connections between each node and the corresponding weights. The machine learning algorithm then compares the generated output with the actual output of the training example. Based on the generated output and the actual output of the training example, the neural network changes the weights associated with each node connection. In some embodiments, the neural network also changes the weights associated with each node during training. The training continues until a training condition is met. The training condition may correspond to, for example, a predetermined number of training examples being used, a minimum accuracy threshold being reached during training and validation, a predetermined number of validation iterations being completed, and the like. Different types of training processes can be used to adjust the bias values and the weights of the node connections based on the training examples. The training processes may include, for example, gradient descent, Newton's method, conjugate gradient, quasi-Newton, Levenberg-Marquardt, among others.

In some examples, the trained machine learning algorithm can be trained with multiple speckle ground truth images. Each ground truth image of a first subset of the multiple speckle ground truth images can include a healthy plant material, and each ground truth image of a second subset of the multiple speckle ground truth images can include an unhealthy plant material. Each of the one or more outputs from the trained machine learning algorithm can include a healthy plant material indication and an unhealthy plant material indication. In other examples, in response to the unhealthy plant material indication of a first output of the one or more outputs, a first speckle image of the one or more speckle images can be provided to another trained machine learning algorithm to identity a type of disease of the first speckle image. In a non-limiting example, the first speckle image can correspond to the first output. In further examples, the trained machine learning algorithm is trained with a plurality of speckle ground truth images, multiple subsets of the plurality of speckle ground truth images corresponding multiple unhealthy types (e.g., a type of disease, a dehydrated state, a type of pest causing the unhealthy state, etc.). For example, the trained machine learning algorithm can produce an output indicating that the part of the plant material of the corresponding speckle image suffers from a black spot, blight, mildew, etc. In further examples, speckle images processed with temporal speckle imaging can provide structural and functional information of the raw images to the machine learning algorithm to establish ground truth for the underlying cause.

For example, FIGS. 4A and 4B are example ground truth speckle images showing bioactivity levels of plants. FIG. 4A shows intact leaf of the *Capsicum annuum,* as the leaf is attached and receives nutrients from soil and water. Thus, the speckle image in FIG. 4A shows a high bioactivity. Thus, the speckle image in FIG. 4A can be used a ground truth speckle image including the healthy plant material. On the other hand, FIG. 4B shows less/no bio activity when the same leaf is tear from the tree as there is no nutrient content for the leaf. Thus, the speckle image in FIG. 4A can be used a ground truth speckle image including the unhealthy plant material. FIGS. 4A and 4B shows two classes of ground truth data. It should be appreciated that more granular ground truth data can be used for training the machine learning algorithm. For example, the level of bioactivity of leaves with a different type (e.g., a type of disease, a dehydrated state, a type of pest causing the unhealthy state, etc.) of unhealthy state can be different and be indicated in a speckle image. Accordingly, the machine learning algorithm can be trained with different types of ground truth speckle images to produce a granular output.

The machine learning algorithm can be constructed or otherwise trained based on training data using one or more different learning techniques, such as supervised learning, unsupervised learning, reinforcement learning, ensemble learning, active learning, transfer learning, or other suitable learning techniques for neural networks. As an example, supervised learning involves presenting a computer system with example inputs and their actual outputs (e.g., categorizations). In these instances, the machine learning algorithm is configured to learn a general rule or model that maps the inputs to the outputs based on the provided example input-output pairs.

Different types of machine learning algorithms can have different network architectures (e.g., number of layers, type of layers, ordering of layers, connections between layers, hyperparameters for layers). In some configurations, neural networks can be structured as a single-layer perceptron network, in which a single layer of output nodes is used and inputs are fed directly to the outputs by a series of weights. In other configurations, neural networks can be structured as multilayer perceptron networks, in which the inputs are fed to one or more hidden layers before connecting to the output layer.

As one example, a machine learning algorithm can be configured as a feedforward network, in which the connections between nodes do not form any loops in the network. As another example, a machine learning algorithm can be configured as a recurrent neural network ("RNN"), in which connections between nodes are configured to allow for previous outputs to be used as inputs while having one or more hidden states, which in some instances may be referred to as a memory of the RNN. RNNs are advantageous for processing time-series or sequential data. Examples of RNNs include long-short term memory ("LSTM") networks, networks based on or using gated recurrent units ("GRUs"), or the like.

A machine learning algorithms can be structured with different connections between layers. In some instances, the layers are fully connected, in which each all of the inputs in one layer are connected to each of the outputs of the previous layer. Additionally or alternatively, neural networks can be structured with trimmed connectivity between some or all layers, such as by using skip connections, dropouts, or the like. In skip connections, the output from one layer jumps forward two or more layers in addition to, or in lieu of, being input to the next layer in the network. An example class of neural networks that implement skip connections are residual neural networks, such as ResNet. In a dropout layer, nodes are randomly dropped out (e.g., by not passing their output on to the next layer) according to a predetermined dropout rate. In some embodiments, a machine learning algorithm can be configured as a convolutional neural network ("CNN"), in which the network architecture includes one or more convolutional layers. In some embodiments, process 200 can use tensor flow lite to deploy the machine learning algorithm to a mobile device. In further embodiment, teachable machine can be used for training model. In further examples, a neural engine on the mobile device can perform the machine learning operation. In even further examples, process 200 can provide ground truth of any plant bioactivity and allow on-board image processing in the mobile device (e.g., by using the temporal speckle contrast algorithm).

At step 218, process 200 can identify one or more healthy status indications of at least the part of the plant material based on one or more outputs from the trained machine learning algorithm. In some examples, a healthy status indication for the part of the plant material included in the corresponding speckle image can be the healthy plant material indication or the unhealthy plant material indication, which is the output from the trained machine learning algorithm. In other examples, the trained machine learning algorithm can provide confidence scores of classes (e.g., the healthy plant material indication and the unhealthy plant material indication). Process 200 can identify healthy status indications based on the confidence scores of classes. In further examples, the healthy status indication can be the healthy plant material indication, or the type of the unhealthy plant material for the part of the plant material in the corresponding speckle image.

At step 220, process 200 can provide plant health information based on the healthy status indication. For example, process 200 can provide plant health information to a user based on the healthy status indication of the part of plant material. In some examples, plant health information can include plant-related information (e.g., a location of the plant material, a date on which the speckle image was recorded, a weather of the day on which the speckle image was recorded, etc.). In further examples, process 200 can collect healthy status indications of plants in a farm and correlate healthy/unhealthy status of the plants based on the healthy status indications in the farm with farm-specific data (e.g., location, crop type, etc.). For example, process 200 can provide indication which crop and/or which location of the farm includes unhealthy or healthy plants. Process 200 can provide precision agricultural suggestions (e.g., remove plant, stop fertilizing, till, water, etc.) to the user based on the healthy status indication of the part of plant material. It should be appreciated that any other suitable agricultural monitoring information can be provided to the user. In further examples, process 200 can be used as a way to monitor how the plant is responding to cold temperatures, which means insulating the plant to keep warm surrounding temperatures. Further, process 200 can be used to find mold spots or rotting areas.

Thus, process 200 can provide non-invasive, quantitative flow imaging modality for agricultural health monitoring using consumer drone and low-cost laser. Process 200 can be completely dynamic and real-time because the drone camera can provide real-time speckle images, and processor and memory on the drone, the imaging device, the light source or any other suitable device can provide the healthy status indication of the plant in real-time or in near real-time basis. Further, process 200 can be easily accessible without or less knowledge of the controlling the drone because current consumer drones come with obstacle avoiding sensors and can be operated by easily with smartphone, and the video can be continuously stream to the smart phone. Further, process 200 can exploit low-cost imaging. For example, the inexpensive laser can be used in process 200. In further examples, multiple lasers can be added to multiple drone/UAV. With the aid of multi drone/UAV system large area of the farmland can be covered. Also, process 200 can use the embedded system in smart phones and inexpensive smartphone for real-time detection of objects with the disclosed machine learning algorithm. Process 200 can be easily combined speckle-based detection method with smartphone-based object detection system. As process 200 can provide ready-to-use data for training the machine learning. In some examples, each singular crop might use might have different needs at a given time. With the biospeckle drone, individual crops can be imaged and analyzed in real-time to determine the best course of care for the individual crops. Further, plants can be susceptible to disease. Process 200 using a drone-based imaging device can detect disease in crops faster than non-assisted optical inspection. Due to the nature of biospeckle imaging, the drone can find the presence of disease within a plant before visual symptoms arise.

In some embodiments, a device for monitoring agricultural crop health can take the form of an application that can be run on a smartphone having a coherent laser attachment. In such embodiments, a coherent laser can be connected to the smartphone and controlled by software running on the processor of the smartphone. The laser may be single or multi-wavelength. When directed by a user, the smartphone can strobe the laser and acquire images of a plant leaf or other part of a plant, to obtain speckle images and typical optical images (without coherent laser illumination) of the same plant part. These images can then be provided to a machine learning algorithm, to indicate to the user whether the plant is exhibiting symptoms (including early symptoms not otherwise ascertainable by a human) of distress or disease.

In other embodiments, an attachment for an aerial drone (such as a quad-copter or fixed-wing drone) can be provided. The attachment may include a coherent laser source, camera, and processor. As the drone approaches the plant of interest (as guided by a user), it may initiate (either automatically or upon user request) speckle image acquisition. A set of video frames may then be pre-processed to determine which frame contains the best image for assessing plant health (whether due to lighting, focus, disturbance/folding of a leaf due to the drone presence, etc.). For example, computer vision techniques (e.g., segmenting, edge detection, etc.) may be utilized to choose an image in which the maximum amount of a plant part of interest (e.g., leaf or stalk) is in the field of view and reasonably in focus. In some embodiments, the algorithm may choose the image that exhibits the most bioactivity. In other embodiments, the algorithm may choose the image that contains the maximum plant surface area in foreground. This can be performed by computer vision and image processing techniques or by a trained machine learning algorithm. Once the best image is selected, it can be provided to a machine learning algorithm to assess plant health. If no video frame of sufficient quality is found, the video clip can simply be discarded. Over the course of an entire field or farm, the drone need only obtain images of sufficient quality for a predetermined number of images per acre or per square meter. If the drone has not obtained sufficient images, it can alert the user to route the drone back over specific zones of the field.

Further embodiments may be utilized to achieve a reduction in carbon/pollutant output for a farm through precision farming techniques. In some embodiments, a device (e.g., drone, attachment to a sprayer, etc.) can develop a map of unhealthy or diseased plants over the area of a given farm.

The operators of the farm can be instructed to remove the unhealthy plants, thereby avoiding waste of resources in irrigation and fertilization. For example, a farm can be sectored by a drone, and each sector can be assigned a plant health score based upon bioactivity levels detected in crop leaves through speckle imaging. Given certain information from the farm operator (e.g., crop type), the device can recommend to the farm operator a given plant for improving health in some sectors and/or abandoning some sectors if plant health is too degraded or certain disease states are found.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for agricultural monitoring, comprising:
    projecting, by a light source, a coherent light output on at least a part of a plant material;
    acquiring, by an imaging device, one or more speckle images based on the coherent light output backscattered by at least the part of the plant material;
    generating a red color image, a green color image, and a blue color image for each of the one or more speckle images;
    determining a plurality of bioactivity levels corresponding to each of the red color image, the green color image, and the blue color image;
    providing the one or more speckle images and the plurality of bioactivity levels to a trained machine learning algorithm;
    identifying one or more healthy status indications of at least the part of the plant material based on one or more outputs from the trained machine learning algorithm, the one or more outputs corresponding to the one or more speckle images and the plurality of bioactivity levels; and
    providing plant health information based on the healthy status indication.

2. The method of claim 1, further comprising:
    positioning mobile hardware over the plant material.

3. The method of claim 1, wherein the coherent light output includes lower than a predetermined level of coherence.

4. The method of claim 1, wherein the coherent light output includes lower than a predetermined level of output power.

5. The method of claim 1, wherein the imaging device comprises a charged coupled device (CCD) sensor, a complementary metal oxide semiconductor (CMOS) sensor, or a single-photon avalanche diode (SPAD) sensor.

6. The method of claim 1, wherein the one or more speckle images are generated by using temporal averaging and standard deviation of a plurality of raw images.

7. The method of claim 1, further comprising:
    selecting the one or more speckle images among a plurality of raw images based on a level of edges in the plurality of raw images.

8. The method of claim 1, further comprising:
    acquiring, by the imaging device, one or more visual images corresponding to the one or more speckle images,
    wherein the one or more visual images are further provided to the trained machine learning algorithm to acquire the one or more outputs from the trained machine learning algorithm.

9. The method of claim 1, wherein the trained machine learning algorithm is trained with a plurality of speckle ground truth images, each of a first subset of the plurality of speckle ground truth images including a healthy plant material, and each of a second subset of the plurality of speckle ground truth images including an unhealthy plant material.

10. The method of claim 9, wherein each of the one or more outputs from the trained machine learning algorithm comprises a healthy plant material indication and an unhealthy plant material indication.

11. The method of claim 10, wherein in response to the unhealthy plant material indication of a first output of the one or more outputs, a first speckle image of the one or more speckle images is provided to another trained machine learning algorithm to identify a type of disease of the first speckle image, the first speckle image corresponding to the first output.

12. The method of claim 1, wherein the trained machine learning algorithm is trained with a plurality of speckle ground truth images, multiple subsets of the plurality of speckle ground truth images corresponding multiple unhealthy types.

13. A system for agricultural monitoring, comprising:
    a memory;
    a processor communicatively coupled to the memory;
    a light source communicatively coupled to the processor; and
    an imaging device communicatively coupled to the processor,
    wherein the memory stores a set of instructions which, when executed by the processor, cause the processor to:
        project, by the light source, a coherent light output on at least a part of a plant material;
        acquire, by the imaging device, one or more speckle images based on the coherent light output backscattered by at least the part of the plant material;
        generate a red color image, a green color image, and a blue color image for each of the one or more speckle images;
        determine a plurality of bioactivity levels corresponding to each of the red color image, the green color image, and the blue color image;
        provide the one or more speckle images and the plurality of bioactivity levels to a trained machine learning algorithm;
        identify one or more healthy status indications of at least the part of the plant material based on one or more outputs from the trained machine learning algorithm, the one or more outputs corresponding to the one or more speckle images and the plurality of bioactivity levels; and
        provide plant health information based on the healthy status indication.

14. The system of claim 13, wherein the set of instructions further cause the processor to:
    positioning mobile hardware over the plant material.

15. The system of claim 13, wherein the coherent light output includes lower than a predetermined level of coherence.

16. The system of claim 13, wherein the coherent light output includes lower than a predetermined level of output power.

17. The system of claim 13, wherein the imaging device comprises a charged coupled device (CCD) sensor, a complementary metal oxide semiconductor (CMOS) sensor, or a single-photon avalanche diode (SPAD) sensor.

18. The system of claim 13, wherein the one or more speckle images are generated by using temporal averaging and standard deviation of a plurality of raw images.

19. The system of claim 13, the set of instructions further cause the processor to:
   selecting the one or more speckle images among a plurality of raw images based on a level of edges in the plurality of raw images.

20. The system of claim 13, the set of instructions further cause the processor to:
   acquiring, by the imaging device, one or more visual images corresponding to the one or more speckle images,
   wherein the one or more visual images are further provided to the trained machine learning algorithm to acquire the one or more outputs from the trained machine learning algorithm.

21. The system of claim 13, wherein the trained machine learning algorithm is trained with a plurality of speckle ground truth images, each of a first subset of the plurality of speckle ground truth images including a healthy plant material, and each of a second subset of the plurality of speckle ground truth images including an unhealthy plant material.

22. The system of claim 21, wherein each of the one or more outputs from the trained machine learning algorithm comprises a healthy plant material indication and an unhealthy plant material indication.

23. The system of claim 22, wherein in response to the unhealthy plant material indication of a first output of the one or more outputs, a first speckle image of the one or more speckle images is provided to another trained machine learning algorithm to identity a type of disease of the first speckle image, the first speckle image corresponding to the first output.

24. The system of claim 13, wherein the trained machine learning algorithm is trained with a plurality of speckle ground truth images, multiple subsets of the plurality of speckle ground truth images corresponding multiple unhealthy types.

* * * * *